(12) United States Patent
Fuchida et al.

(10) Patent No.: US 10,955,699 B2
(45) Date of Patent: Mar. 23, 2021

(54) OPTICAL LAYERED BODY AND LIQUID CRYSTAL DISPLAY DEVICE USING OPTICAL LAYERED BODY

(71) Applicant: NITTO DENKO CORPORATION, Ibaraki (JP)

(72) Inventors: Takehito Fuchida, Ibaraki (JP); Hiroaki Fumoto, Ibaraki (JP); Katsunori Takada, Ibaraki (JP); Yoshitsugu Kitamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/334,909

(22) PCT Filed: Sep. 22, 2017

(86) PCT No.: PCT/JP2017/034325
§ 371 (c)(1),
(2) Date: Mar. 20, 2019

(87) PCT Pub. No.: WO2018/062043
PCT Pub. Date: Apr. 5, 2018

(65) Prior Publication Data
US 2019/0285937 A1 Sep. 19, 2019

(30) Foreign Application Priority Data
Sep. 27, 2016 (JP) .............. JP2016-188176

(51) Int. Cl.
*G02F 1/1335* (2006.01)
*G02B 5/00* (2006.01)
(Continued)

(52) U.S. Cl.
CPC ......... *G02F 1/133524* (2013.01); *G02B 5/00* (2013.01); *G02B 5/02* (2013.01);
(Continued)

(58) Field of Classification Search
None
See application file for complete search history.

(56) References Cited

U.S. PATENT DOCUMENTS 8,395,726 B2   3/2013   Shiota et al.
9,176,264 B2  11/2015   Nishimura et al.
(Continued)

FOREIGN PATENT DOCUMENTS

CN   101395524 A   3/2009
CN   102033434 A   4/2011
(Continued)

OTHER PUBLICATIONS

Translation of JP2017167506A (Year: 2020).*
(Continued)

*Primary Examiner* — Phu Vu
(74) *Attorney, Agent, or Firm* — Westerman, Hattori, Daniels & Adrian, LLP

(57) ABSTRACT

There is provided an optical laminate that can achieve a liquid crystal display apparatus in which the occurrence of moire is suppressed, and which is excellent in brightness and viewing angle characteristic. An optical laminate of the present invention includes in the stated order: a polarizer; a light-diffusing pressure-sensitive adhesive layer; a matte layer; and a louver layer. The louver layer has light-transmitting portions each having a trapezoidal section arrayed along a film plane, and light-absorbing portions each having a trapezoidal section arrayed between the light-transmitting portions. A haze value H of the light-diffusing pressure-sensitive adhesive layer and a bias angle B of the louver layer satisfy relationships represented by the following expressions (1) to (3):

$2 \leq B \leq 6$ (1)

$20 \leq H \leq 60$ (2)

$B \times H \geq 40$ (3)

(Continued)

where the bias angle means a tilt angle of each of the trapezoidal sections with respect to a normal direction.

8 Claims, 1 Drawing Sheet

(51) Int. Cl.
 *G02B 5/30* (2006.01)
 *G02B 5/02* (2006.01)
(52) U.S. Cl.
 CPC ............. *G02B 5/30* (2013.01); *G02F 1/1335* (2013.01); *G02F 1/133504* (2013.01); *G02F 1/133528* (2013.01)

(56) References Cited

U.S. PATENT DOCUMENTS

| | | | |
|---|---|---|---|
| 9,329,311 | B2 | 5/2016 | Halverson et al. |
| 9,354,372 | B2 | 5/2016 | Kamijo et al. |
| 2006/0104084 | A1 | 5/2006 | Amemiya et al. |
| 2009/0165943 | A1* | 7/2009 | Kim .................. G02F 1/133504 156/276 |
| 2011/0080538 | A1 | 4/2011 | Shiota et al. |
| 2013/0135750 | A1 | 5/2013 | Walker, Jr. et al. |
| 2013/0265506 | A1 | 10/2013 | Nishimura et al. |
| 2014/0204464 | A1 | 7/2014 | Halverson et al. |
| 2015/0226999 | A1 | 8/2015 | Fuchida et al. |
| 2015/0316696 | A1 | 11/2015 | Kamijo et al. |
| 2016/0238863 | A1 | 8/2016 | Kashiwagi |
| 2018/0128959 | A1 | 5/2018 | Kashiwagi |

FOREIGN PATENT DOCUMENTS

| | | |
|---|---|---|
| CN | 103109213 A | 5/2013 |
| CN | 104620143 A | 5/2015 |
| CN | 104641268 A | 5/2015 |
| JP | 2006-171701 A | 6/2006 |
| JP | 2009-528567 A | 8/2009 |
| JP | 2010-217871 A | 9/2010 |
| JP | 2012-88692 A | 5/2012 |
| JP | 2014-517347 A | 7/2014 |
| JP | 2014-224964 A | 12/2014 |
| JP | 2015-52796 A | 3/2015 |
| JP | 2015-121792 A | 7/2015 |
| JP | 2016-114617 A | 6/2016 |
| JP | 2016-151710 A | 8/2016 |
| JP | 2017-167506 A | 9/2017 |
| JP | 2017-203979 A | 11/2017 |

OTHER PUBLICATIONS

Extended (Supplementary) European Search Report dated May 4, 2020, issued in counterpart EP application No. 17855997.7. (8 pages).

International Search Report dated Nov. 28, 2017, issued in counterpart International Application No. PCT/JP2017/034325 (2 pages).

Office Action dated Jun. 4, 2019, issued in counterpart JP Application No. 2016-188176, with English translation (13 pages).

Office Action dated Dec. 8, 2020, issued in counterpart CN Application No. 201780059242.X, with English Translation. (10 pages).

* cited by examiner

OPTICAL LAYERED BODY AND LIQUID CRYSTAL DISPLAY DEVICE USING OPTICAL LAYERED BODY

TECHNICAL FIELD

The present invention relates to an optical laminate and a liquid crystal display apparatus using the optical laminate.

BACKGROUND ART

Liquid crystal display apparatus have been used in a wide range of applications including a television, a smartphone, a personal computer monitor, and a digital camera, and the applications thereof have been further expanding. Examples of the applications include on-board applications. Specifically, the liquid crystal display apparatus may be used for display portions of, for example, various meters and a navigation system arranged in an instrument panel, and a console of an automobile. In such on-board applications, there is a problem in that a display image is reflected in a windshield. In order to solve such problem, it has been proposed to use a louver film to be installed in the liquid crystal display apparatus (for example, Patent Literature 1). However, the use of the louver film in the liquid crystal display apparatus involves a problem in that image quality is significantly degraded by occurrence of moire, an insufficient viewing angle characteristic, or the like.

CITATION LIST

Patent Literature

[PTL 1] JP 2015-52796 A

SUMMARY OF INVENTION

Technical Problem

The present invention has been made in order to solve the problem as described above, and an object of the present invention is to provide an optical laminate that can achieve a liquid crystal display apparatus in which the occurrence of moire is suppressed, and which is excellent in brightness and viewing angle characteristic.

Solution to Problem

An optical laminate according to an embodiment of the present invention includes in the stated order: a polarizer; a light-diffusing pressure-sensitive adhesive layer; a matte layer; and a louver layer. The louver layer has light-transmitting portions each having a trapezoidal section arrayed along a film plane, and light-absorbing portions each having a trapezoidal section arrayed between the light-transmitting portions. A haze value H of the light-diffusing pressure-sensitive adhesive layer and a bias angle B of the louver layer satisfy relationships represented by the following expressions (1) to (3):

$$2 \leq B \leq 6 \quad (1)$$

$$20 \leq H \leq 60 \quad (2)$$

$$B \times H \geq 40 \quad (3)$$

where the bias angle means a tilt angle of each of the trapezoidal sections with respect to a normal direction.

In one embodiment of the present invention, the light-diffusing pressure-sensitive adhesive layer contains a pressure-sensitive adhesive and light-diffusible fine particles dispersed in the pressure-sensitive adhesive. The pressure-sensitive adhesive has a refractive index of from 1.47 to 1.60, and the light-diffusible fine particles each have a refractive index lower than the refractive index of the pressure-sensitive adhesive.

In one embodiment of the present invention, a refractive index difference between each of the light-diffusible fine particles and the pressure-sensitive adhesive is more than 0 and 0.2 or less.

In one embodiment of the present invention, the light-diffusible fine particles include silicone resin fine particles.

In one embodiment of the present invention, the light-diffusible fine particles have a volume-average particle diameter of from 1 μm to 4 μm.

In one embodiment of the present invention, a surface of the matte layer has an arithmetic average roughness Ra of 20 nm or more.

In one embodiment of the present invention, the matte layer contains fine particles, and the fine particles have a mode particle diameter in a range of ±50% of a thickness of the matte layer.

According to another aspect of the present invention, there is provided a liquid crystal display apparatus. The liquid crystal display apparatus includes: a liquid crystal cell; and the above-described optical laminate arranged on an opposite side of the liquid crystal cell to a viewer side. The polarizer of the optical laminate is arranged on a liquid crystal cell side.

Advantageous Effects of Invention

According to the embodiment of the present invention, in the optical laminate including the louver layer, a configuration in which the light-diffusing pressure-sensitive adhesive layer and the matte layer are adjacent to each other is adopted, and besides, the relationship between the haze value of the light-diffusing pressure-sensitive adhesive layer and the bias angle of the louver layer is optimized, and thus the optical laminate that can achieve a liquid crystal display apparatus in which the occurrence of moire is suppressed, and which is excellent in brightness and viewing angle characteristic can be obtained.

DESCRIPTION OF EMBODIMENTS

Typical embodiments of the present invention are described below. However, the present invention is not limited to these embodiments.

A. Overall Configuration of Optical Laminate

Figure 1:
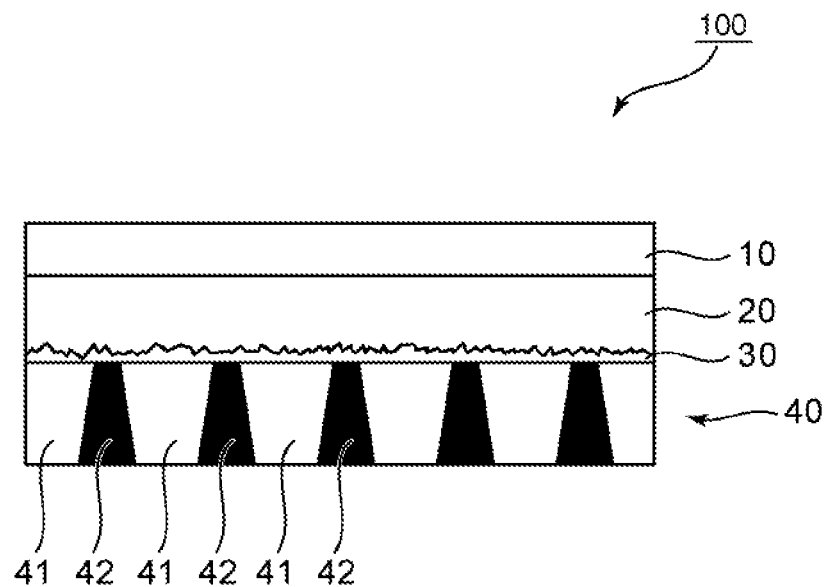
FIG. 1 is a schematic sectional view of an optical laminate according to one embodiment of the present invention.
Figure 2:
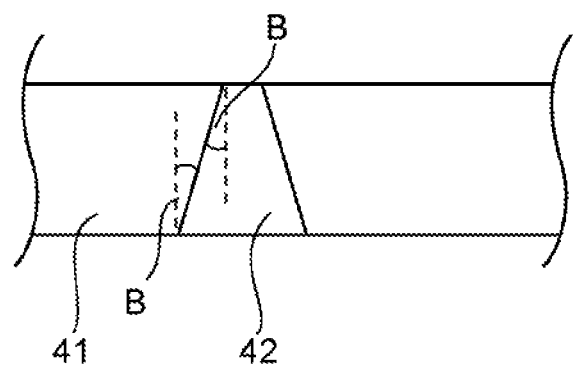
FIG. 2 is an enlarged sectional view of a main portion of a louver layer of FIG. 1, for illustrating a bias angle.

FIG. 1 is a schematic sectional view of an optical laminate according to one embodiment of the present invention. An optical laminate 100 according to this embodiment includes a polarizer 10, a light-diffusing pressure-sensitive adhesive layer 20, a matte layer 30, and a louver layer 40 in the stated order. That is, in the optical laminate 100, the polarizer and the louver layer (louver film) are integrated. Through the integration, the thinning of a liquid crystal display apparatus is achieved, and besides, the simplification of the liquid crystal display apparatus and a manufacturing method therefor is achieved as a result of a reduced parts count. The louver layer 40 has light-transmitting portions 41 each having a trapezoidal section arrayed along a film plane, and light-absorbing portions 42 each having a trapezoidal section arrayed between the light-transmitting portions 41. In the embodiment of the present invention, a haze value H of the light-diffusing pressure-sensitive adhesive layer 20 and a bias angle B of the louver layer 40 satisfy relationships represented by the following expressions (1) to (3):

$$2 \leq B \leq 6 \quad (1)$$

$$20 \leq H \leq 60 \quad (2)$$

$$B \times H \geq 40 \quad (3)$$

where the bias angle means, as illustrated in FIG. 2, the tilt angle of each of the trapezoidal sections with respect to a normal direction. By virtue of satisfying the relationships represented by the expressions (1) to (3), there can be obtained an optical laminate that can achieve a liquid crystal display apparatus in which the occurrence of moire is suppressed, and which has a high brightness and also has a viewing angle characteristic appropriate for on-board applications. Particularly by virtue of satisfying the expression (3), there can be obtained an optical laminate that can achieve a liquid crystal display apparatus excellent in balance among those three characteristics (i.e., all the three characteristics fall within satisfactory or acceptable ranges). Typical examples of the viewing angle characteristic appropriate for on-board applications include: such a viewing angle characteristic that a brightness cone excellent in symmetry is obtained; and a viewing angle characteristic that can prevent the reflection of a display image in a windshield.

In the optical laminate according to the embodiment of the present invention, any of various optical functional layers (not shown) may be arranged at a predetermined position as required. Examples of the optical functional layers include a protective layer, a retardation layer, an antiblocking layer, and a substrate. The protective layer may be arranged on one side or each of both sides of the polarizer 10. The retardation layer may be typically arranged on the opposite side of the polarizer 10 to the louver layer 40 (typically a liquid crystal cell side in the case where the optical laminate is applied to a liquid crystal display apparatus). The optical characteristics (e.g., refractive index ellipsoid, in-plane retardation, thickness direction retardation, Nz coefficient, wavelength dispersion characteristic, and photoelastic coefficient), mechanical characteristics, number of layers to be arranged, combination, and the like of the retardation layer may be appropriately set depending on purposes. The antiblocking layer may be typically arranged on the opposite side of the louver layer 40 to the polarizer 10 (i.e., as an outermost layer of the optical laminate). The arrangement of the antiblocking layer can satisfactorily prevent blocking of the optical laminate. The substrate may be typically arranged between the matte layer 30 and the louver layer 40. In one embodiment, the substrate is for use in applying, and as required, curing a resin composition for forming the matte layer, and may be incorporated into the optical laminate as a laminate with the matte layer depending on purposes. In another embodiment, the substrate is used during the production of the louver layer (louver film), and may be incorporated into the optical laminate as a laminate with the louver layer depending on purposes. Needless to say, any appropriate optical functional layer other than the foregoing may be arranged depending on purposes.

In one embodiment, the optical laminate of the present invention has an elongate shape. The optical laminate having an elongate shape may be, for example, rolled into a roll shape to be stored and/or transported.

Now, the constituent elements of the optical laminate are described.

B. Polarizer Any appropriate polarizer may be adopted as the polarizer 10. For example, a resin film for forming the polarizer may be a single-layer resin film, or may be a laminate of two or more layers.

Specific examples of the polarizer formed of a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

A specific example of the polarizer obtained by using a laminate is a polarizer obtained by using a laminate of a resin substrate and a PVA-based resin layer (PVA-based resin film) laminated on the resin substrate or a laminate of a resin substrate and a PVA-based resin layer formed on the resin substrate through application. The polarizer obtained by using the laminate of the resin substrate and the PVA-based resin layer formed on the resin substrate through application may be produced, for example, by: applying a PVA-based resin solution to the resin substrate; drying the solution to form the PVA-based resin layer on the resin substrate, to thereby provide the laminate of the resin substrate and the PVA-based resin layer; and stretching and dyeing the laminate to turn the PVA-based resin layer into the polarizer. In this embodiment, the stretching typically includes stretching of the laminate under a state in which the laminate is immersed in an aqueous solution of boric acid. Further, the stretching may further include in-air stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer depending on purposes is laminated on the peeling surface. Details of such method of producing the polarizer are described in, for example, JP 2012-73580 A, the description of which is incorporated herein by reference in its entirety.

The thickness of the polarizer is preferably from 1 µm to 80 µm, more preferably from 10 µm to 50 µm, still more preferably from 15 µm to 40 µm, particularly preferably from 20 µm to 30 µm. When the thickness of the polarizer falls within such range, durability under high temperature and high humidity can be excellent.

The polarizer preferably shows absorption dichroism at any wavelength in the wavelength range of from 380 nm to 780 nm. The single layer transmittance of the polarizer is preferably from 40.0% to 46.0%, more preferably from 41.0% to 44.0%. The polarization degree of the polarizer is preferably 97.0% or more, more preferably 99.0% or more, still more preferably 99.9% or more.

As described in the section A, a protective layer (not shown) may be arranged on at least one surface of the polarizer 10. The polarizer and the protective layer (protective film) may each be incorporated into the optical laminate as a separate member, or may be incorporated into the optical laminate as an integrated laminate (polarizing plate).

The protective layer is formed of any appropriate film that may be used as a protective layer for a polarizer. As a material serving as a main component of the film, there are specifically given, for example, cellulose-based resins, such as triacetylcellulose (TAC), and transparent resins, such as polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, and acetate-based resins. There are also given, for example, thermosetting resins or UV-curable resins, such as (meth) acrylic, urethane-based, (meth)acrylic urethane-based, epoxy-based, and silicone-based resins. There are also given, for example, glassy polymers, such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as a material for the film, and the composition is, for example, a resin composition containing an alternating copolymer formed of isobutene and N-methylmaleimide, and an acrylonitrile-styrene copolymer. The polymer film may be, for example, an extrudate of the resin composition.

The thickness of the protective layer is typically 5 mm or less, preferably 1 mm or less, more preferably from 1 µm to 500 µm, still more preferably from 5 µm to 150 µm.

When the protective layer (hereinafter referred to as "inner protective layer") is arranged on the liquid crystal cell side of the polarizer 10, the inner protective layer is preferably optically isotropic. The phrase "be optically isotropic" refers to having an in-plane retardation Re(550) of from 0 nm to 10 nm and a thickness direction retardation Rth(550) of from −10 nm to +10 nm. The inner protective layer may include any appropriate material as long as the inner protective layer is optically isotropic. The material may be appropriately selected from, for example, the materials described above for the protective layer.

The thickness of the inner protective layer is preferably from 5 µm to 200 µm, more preferably from 10 µm to 100 µm, still more preferably from 15 µm to 95 µm.

C. Light-Diffusing Pressure-Sensitive Adhesive Layer

The light-diffusing pressure-sensitive adhesive for forming the light-diffusing pressure-sensitive adhesive layer 20 typically contains a pressure-sensitive adhesive and light-diffusible fine particles dispersed in the pressure-sensitive adhesive.

A base polymer for the pressure-sensitive adhesive typically includes a (meth)acrylic polymer. The (meth)acrylic polymer contains, as a monomer unit, an alkyl (meth) acrylate for forming a main skeleton of the (meth)acrylic polymer. Examples of the alkyl (meth)acrylate may include linear or branched alkyl groups each having 1 to 18 carbon atoms. Specific examples thereof include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, and an octadecyl group. The (meth) acrylic polymer preferably contains an aromatic ring-containing (meth)acrylic monomer as a monomer unit. As the aromatic ring-containing (meth)acrylic monomer, for example, benzyl (meth)acrylate may be used. The (meth) acrylic polymer may further contain a carboxyl group-containing monomer and/or a hydroxyl group-containing monomer as a monomer unit. Examples of the carboxyl group-containing monomer include (meth)acrylic acid, carboxyethyl (meth)acrylate, carboxypentyl (meth)acrylate, itaconic acid, maleic acid, fumaric acid, and crotonic acid. Examples of the hydroxyl group-containing monomer include 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, and (4-hydroxymethylcyclohexyl)-methyl acrylate. The monomers may be used alone or in combination thereof.

The pressure-sensitive adhesive may contain a cross-linking agent. Examples of the cross-linking agent include an organic cross-linking agent and a polyfunctional metal chelate. Examples of the organic cross-linking agent include an isocyanate-based cross-linking agent, a peroxide-based cross-linking agent, an epoxy-based cross-linking agent, an imine-based cross-linking agent.

The pressure-sensitive adhesive may contain any appropriate additive. Examples of the additive include an antistatic agent, an antioxidant, and a coupling agent. The kinds, addition amounts, combination, and the like of the additives may be appropriately set depending on purposes.

The refractive index of the pressure-sensitive adhesive is preferably from 1.47 to 1.60, more preferably from 1.47 to 1.55. When the refractive index of the pressure-sensitive adhesive falls within such range, a refractive index difference from each of the light-diffusible fine particles can be set within a desired range. Accordingly, a light-diffusing pressure-sensitive adhesive layer having a desired haze value can be obtained. Further, through the use of such pressure-sensitive adhesive in combination with light-diffusible fine particles having a desired volume-average particle diameter (described later), a light-diffusing pressure-sensitive adhesive layer having a desired haze value and having a neutral hue can be obtained. As a result, an optical laminate that can achieve a liquid crystal display apparatus in which moire is suppressed, and which has a high brightness can be obtained.

Any appropriate fine particles may be used as the light-diffusible fine particles as long as the effects of the present invention are obtained. Specific examples thereof include inorganic fine particles and polymer fine particles. The light-diffusible fine particles are preferably the polymer fine particles. A material for the polymer fine particles is, for example, a silicone resin, a (meth)acrylic resin (e.g., polymethyl methacrylate), a polystyrene resin, a polyurethane resin, or a melamine resin. Those resins can each provide a light-diffusing pressure-sensitive adhesive layer excellent in diffusing performance because the resins each have excellent dispersibility in the pressure-sensitive adhesive and an appropriate refractive index difference from the pressure-sensitive adhesive. Of those, a silicone resin or polymethyl methacrylate is preferred. The shape of each of the light-diffusible fine particles may be, for example, a perfect spherical shape, a flat shape, or an indefinite shape. The light-diffusible fine particles may be used alone or in combination thereof.

The refractive index of each of the light-diffusible fine particles is typically lower than the refractive index of the pressure-sensitive adhesive. The refractive index of each of the light-diffusible fine particles is preferably from 1.30 to 1.60, more preferably from 1.40 to 1.55. When the refractive index of each of the light-diffusible fine particles falls within such range, a refractive index difference from the pressure-sensitive adhesive can be set within a desired range. Therefore, a light-diffusing pressure-sensitive adhesive layer having a desired haze value can be obtained. As a result, an optical laminate that can achieve a liquid crystal display apparatus in which moire is suppressed, and which has a high brightness can be obtained.

The refractive index difference between each of the light-diffusible fine particles and the pressure-sensitive adhesive is preferably more than 0 and 0.2 or less, more preferably more than 0 and 0.15 or less, still more preferably from 0.01 to 0.13. When the refractive index difference falls within such range, the moire-suppressing effect and the brightness-enhancing effect can be made more excellent.

The volume-average particle diameter of the light-diffusible fine particles is preferably from 1 μm to 4 μm, more preferably from 2 μm to 4 μm. When the volume-average particle diameter of the light-diffusible fine particles falls within such range, through the use of such light-diffusible fine particles in combination with the pressure-sensitive adhesive having a desired refractive index, a light-diffusing pressure-sensitive adhesive layer having a desired haze value and having a neutral hue can be obtained. The volume-average particle diameter may be measured with, for example, an ultracentrifugal automatic particle size distribution-measuring apparatus.

The content of the light-diffusible fine particles in the light-diffusing pressure-sensitive adhesive is preferably from 0.3 wt % to 50 wt %, more preferably from 3 wt % to 48 wt %. When the content of the light-diffusible fine particles is set within the range, a light-diffusing pressure-sensitive adhesive layer having a desired haze value can be obtained.

The haze value of the light-diffusing pressure-sensitive adhesive layer (light-diffusing pressure-sensitive adhesive after curing) satisfies the expression (2). Therefore, the haze value is from 20% to 60%, preferably from 20% to 50%, more preferably from 20% to 40%. When the haze value is set within the above-mentioned range, the occurrence of moire can be satisfactorily suppressed, and besides, a predetermined brightness can be achieved.

The total light transmittance of the light-diffusing pressure-sensitive adhesive layer is preferably 75% or more, more preferably 80% or more, still more preferably 85% or more.

Details of the light-diffusing pressure-sensitive adhesive are described in, for example, JP 2014-224964 A, the description of which is incorporated herein by reference.

D. Matte Layer

In the embodiment of the present invention, the matte layer 30 is arranged so as to be adjacent to the light-diffusing pressure-sensitive adhesive layer 20, and thus the occurrence of moire can be remarkably suppressed while excellent characteristics resulting from the louver layer (typically a viewing angle characteristic appropriate for on-board applications) are maintained. This presumably results from a synergistic action of the matte layer and the light-diffusing pressure-sensitive adhesive layer, is a finding obtained for the first time by applying an optical laminate including the matte layer and the light-diffusing pressure-sensitive adhesive layer in combination to a liquid crystal display apparatus for on-board applications, and is an unexpected excellent effect.

The matte layer typically has an uneven surface on the light-diffusing pressure-sensitive adhesive layer 20 side. The uneven surface may be a fine uneven surface, or may be a surface having a flat portion and a protruding portion. In one embodiment, the surface of the matte layer preferably has an arithmetic average roughness Ra of 20 nm or more, more preferably from 20 nm to 50 nm. The uneven surface may be formed by, for example, incorporating fine particles into a resin composition for forming the matte layer, and/or causing the resin composition for forming the matte layer to undergo phase separation.

As a resin to be used for the resin composition, there are given, for example, a thermosetting resin, a thermoplastic resin, a UV-curable resin, an electron beam-curable resin, and a two-component resin. Of those, a UV-curable resin is preferred. This is because the matte layer can be efficiently formed by an easy processing operation.

Any appropriate resin may be used as the UV-curable resin. Specific examples thereof include a polyester-based resin, an acrylic resin, a urethane-based resin, an amide-based resin, a silicone-based resin, and an epoxy-based resin. The UV-curable resin encompasses a UV-curable monomer, oligomer, or polymer. In one embodiment of the present invention, urethane (meth)acrylate may be suitably used as the UV-curable resin.

A urethane (meth)acrylate containing, as constituents, (meth)acrylic acid, a (meth)acrylate, a polyol, and a diisocyanate may be used as the urethane (meth)acrylate. The urethane (meth)acrylate may be produced by, for example, producing a hydroxy (meth)acrylate containing one or more hydroxy groups by using at least one monomer selected from (meth)acrylic acid and the (meth)acrylate, and the polyol, and subjecting the hydroxy (meth)acrylate to a reaction with the diisocyanate. The urethane (meth)acrylates may be used alone or in combination thereof.

Any appropriate fine particles may be used as the fine particles. The fine particles preferably each have transparency. As a material for forming such fine particles, there are given a metal oxide, glass, and a resin. Specific examples thereof include: inorganic fine particles of silica, alumina, titania, zirconia, calcium oxide, and the like; organic fine particles of polymethyl methacrylate, polystyrene, polyurethane, an acrylic resin, an acrylic-styrene copolymer, benzoguanamine, melamine, polycarbonate, and the like; and silicone-based particles. The fine particles may be used alone or in combination thereof. Of those, organic fine particles are preferred, and fine particles of an acrylic resin are more preferred. This is because their refractive indices are appropriate.

The mode particle diameter of the fine particles may be appropriately set depending on the haze and the like of the matte layer. The mode particle diameter of the fine particles falls within the range of from, for example, 50% of the thickness of the matte layer to 150% thereof. Herein, the "mode particle diameter" refers to a particle diameter indicating a maximum value of a particle distribution, and is determined by measurement with a flow particle image analyzer (manufactured by Sysmex Corporation, product name: "FPTA-3000S") under predetermined conditions (Sheath liquid: ethyl acetate, measurement mode: HPF measurement, measuring method: total count). As a measurement sample, there may be used a dispersion obtained by diluting the particles with ethyl acetate to 1.0 wt % and uniformly dispersing the particles with an ultrasonic cleaning machine.

The content of the fine particles is preferably from 0.05 part by weight to 1.0 part by weight, more preferably from 0.1 part by weight to 0.5 part by weight, still more preferably from 0.1 part by weight to 0.2 part by weight with respect to 100 parts by weight of the solid content of the resin composition. When the content of the fine particles is excessively small, the moire-suppressing effect is insufficient in some cases. When the content of the fine particles is excessively large, the haze of the matte layer may be increased to make the brightness and viewability of the liquid crystal display apparatus insufficient.

The resin composition may further contain any appropriate additive depending on purposes. Specific examples of the additive include a reactive diluent, a plasticizer, a surfactant, an antioxidant, a UV absorber, a leveling agent, a thixotropic agent, and an antistatic agent. The number, kinds, combination, addition amounts, and the like of the additives may be appropriately set depending on purposes.

The matte layer may be typically formed by applying a resin composition onto the surface of any appropriate substrate and curing the applied resin composition. Any appropriate method may be adopted as an application method. Specific examples of the application method include a dip coating method, an air knife coating method, a curtain coating method, a roller coating method, a wire bar coating method, a gravure coating method, a die coating method, and an extrusion coating method. A curing method may be appropriately selected depending on the kind of the resin contained in the resin composition. For example, when a UV-curable resin is used, the matte layer may be formed by appropriately curing the resin composition through irradiation with UV light at an exposure dose of, for example, 150 mJ/cm$^2$ or more, preferably from 200 mJ/cm$^2$ to 1,000 mJ/cm$^2$.

The thickness of the matte layer is preferably from 0.5 μm to 2.0 μm, more preferably from 0.8 μm to 1.5 μm. With such thickness, a sufficient moire-suppressing effect can be achieved without adversely affecting optical characteristics desired of the optical laminate.

Details of the configuration, material, and formation method, and the like of the matte layer are described as the description of an antiblocking layer in, for example, JP 2015-115171 A, JP 2015-141674 A, JP 2015-120870 A, or JP 2015-005272 A, the description of which is incorporated herein by reference.

E. Louver Layer

The louver layer 40 includes a louver film. As described above, the louver layer (louver film) 40 has the light-transmitting portions 41, 41, . . . arrayed along the film plane, and the light-absorbing portions 42, 42, . . . arrayed between the light-transmitting portions 41, 41, . . . . The light-transmitting portions 41, 41, . . . and the light-absorbing portions 42, 42, . . . extend in the far-near direction of the drawing. That is, the light-transmitting portions 41, 41, . . . and the light-absorbing portions 42, 42, . . . are alternately formed in a stripe shape when the louver layer is viewed from a normal direction. The light-transmitting portions 41, 41, . . . and the light-absorbing portions 42, 42, . . . each have an approximately trapezoidal sectional shape in a section appearing in FIG. 1. More specifically, the light-transmitting portions 41, 41, . . . each have a trapezoidal section in which the upper base is longer than the lower base, and the light-absorbing portions 42, 42, . . . each have a trapezoidal section in which the lower base is longer than the upper base.

The bias angle of the louver layer 40 satisfies the expression (1). Therefore, the bias angle is from 2° to 6°, preferably from 3° to 6°, more preferably from 4° to 6°. When the bias angle is excessively small, the moire-suppressing effect is insufficient in some cases. When the bias angle is excessively large, the appropriate viewing angle characteristic is not obtained in some cases. When the bias angle and the haze value of the light-diffusing pressure-sensitive adhesive layer are optimized so as to satisfy the expressions (1) to (3), the moire-suppressing effect, the brightness-enhancing effect, and the viewing angle characteristic appropriate for on-board applications can be simultaneously satisfied. As illustrated in FIG. 2, the bias angle means the tilt angle of each of the trapezoidal sections with respect to the normal direction of the louver layer (i.e., an angle formed between an oblique side of the trapezoid and the normal direction).

The refractive index of each of the light-transmitting portions is preferably from 1.49 to 1.56 from the viewpoint of, for example, the ease of availability of a material. The refractive index of each of the light-absorbing portions is typically lower than the refractive index of each of the light-transmitting portions. A difference between the refractive index of each of the light-absorbing portions and the refractive index of each of the light-transmitting portions is preferably more than 0 and 0.06 or less.

The light-transmitting portions may each be typically formed of a photocurable resin. Specific examples of the photocurable resin include an epoxy (meth)acrylate-based resin, a urethane (meth)acrylate-based resin, a polyether (meth)acrylate-based resin, a polyester (meth)acrylate-based resin, and a polythiol-based resin.

The light-absorbing portions may each be typically formed of a photocurable resin containing light-absorbable particles. Specific examples of the photocurable resin include an epoxy (meth)acrylate-based resin, a urethane (meth)acrylate-based resin, a polyester (meth)acrylate-based resin, and a butadiene (meth)acrylate-based resin. Specific examples of the light-absorbable fine particles include: carbon black, graphite, metal salts, such as black iron oxide, organic fine particles colored with a dye, a pigment, or the like, and colored glass beads.

The louver layer (louver film) may be produced by, for example, a method including the following: (1) applying a material for forming light-transmitting portions to any appropriate substrate, followed by predetermined treatment, to thereby form the light-transmitting portions; (2) forming, in the light-transmitting portions, grooves of shapes corresponding to the light-absorbing portions; (3) filling the formed grooves with a material for forming the light-absorbing portions; (4) subjecting the material filling the grooves to predetermined treatment to form the light-absorbing portions; and (5) removing (typically peeling off) the substrate as required.

Details of the constituent materials and production method for the louver film are described in, for example, JP 2015-52796 A, the description of which is incorporated herein by reference.

F. Liquid Crystal Display Apparatus

The optical laminate described in the section A to the section E may be applied to a liquid crystal display apparatus. Therefore, the present invention encompasses a liquid crystal display apparatus using such optical laminate. A liquid crystal display apparatus according to an embodiment of the present invention includes a liquid crystal cell, and the optical laminate described in the section A to the section E arranged on the opposite side of the liquid crystal cell to a viewer side. The optical laminate is arranged so that the polarizer may be on a liquid crystal cell side. The liquid crystal cell may be of a homeotropic alignment type (e.g., a VA mode), or may be of a homogeneous alignment type (e.g., an IPS mode).

EXAMPLES

The present invention is specifically described below by way of Examples. However, the present invention is not limited by these Examples. Methods of measuring respective characteristics are as described below. In addition, the terms "part(s)" and "%" are on a weight basis unless otherwise stated.

(1) Haze Value

The haze values of light-diffusing pressure-sensitive adhesives (i.e., light-diffusing pressure-sensitive adhesive layers) after curing used in Examples and Comparative Examples were measured by a method specified in JIS K 7136 with a haze meter (manufactured by Murakami Color Research Laboratory Co., Ltd., product name: "HN-150").

(2) Brightness

A white image was displayed on a liquid crystal display apparatus obtained in each of Examples and Comparative Examples, and a brightness in a front direction was measured using a brightness meter (manufactured by Autronic-Melchers GmbH, product name: "Conoscope"). Evaluation was performed by the following evaluation criteria.

⊚: 310 cd/m$^2$ or more
o: 290 cd/m$^2$ or more
Δ: 270 cd/m$^2$ or more
x: 269 cd/m$^2$ or less (3) Viewing Angle Characteristic Brightnesses in all azimuth angle directions at polar angles of from 0° to 80° were measured in the same manner as in (2) above, and the ratio of a brightness at a polar angle of 65° and an azimuth angle of 25° to a brightness at a polar angle of 65° and an azimuth angle of 155° was calculated and used as an indicator of a viewing angle characteristic.

⊚: 0.50 or more
o: 0.25 or more
Δ: 0.20 or more
x: 0.19 or less (4) Moire

The image quality of the liquid crystal display apparatus obtained in each of Examples and Comparative Examples was visually observed, and evaluation was performed by the following criteria.

⊚: No moire was found.
o: Slight moire was found, but was not such as to affect the image quality.
Δ: Moire was found, and affected the image quality.
x: The occurrence of moire was significant.

Example 1

1. Preparation of Light-Diffusing Pressure-Sensitive Adhesive 1-1. Preparation of Base Polymer of Pressure-Sensitive Adhesive (Acrylic Polymer)

74.9 Parts of butyl acrylate, 20 parts of benzyl acrylate, 5 parts of acrylic acid, 0.1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate (monomer concentration: 50%). While the mixture was gently stirred, a nitrogen gas was introduced to purge the flask with nitrogen. After that, the temperature of a liquid in the flask was kept at about 55° C., and a polymerization reaction was performed for 8 hours. Thus, a solution of an acrylic polymer having a weight-average molecular weight (Mw) of 2,040,000 and a ratio "Mw/Mn" of 3.2 was prepared.

1-2. Preparation of Light-Diffusing Pressure-Sensitive Adhesive

An application liquid of a light-diffusing pressure-sensitive adhesive (solid content: 11%) was prepared by compounding 100 parts of the solid content of the acrylic polymer solution obtained above with 0.45 part of an isocyanate cross-linking agent (CORONATE L manufactured by Nippon Polyurethane Industry Co., Ltd., a tolylene diisocyanate adduct of trimethylolpropane), 0.1 part of benzoyl peroxide (manufactured by Nippon Oil & Fats Co., Ltd., NYPER BMT), 0.1 part of a silane coupling agent (KBM-403 manufactured by Shin-Etsu Chemical Co., Ltd.), and 3.1 parts of silicone resin fine particles (TOSPEARL 130 manufactured by Momentive Performance Materials Japan LLC, volume-average particle diameter: 3 μm) serving as light-diffusible fine particles.

2. Production of Polarizing Plate with Light-Diffusing Pressure-Sensitive Adhesive Layer 2-1. Production of Polarizing Plate A polyvinyl alcohol film having a thickness of 80 μm was stretched to 3 times between rolls having different speed ratios while being dyed in an iodine solution at 30° C. having a concentration of 0.3% for 1 minute. After that, the film was stretched until the total stretching ratio became 6 times while being immersed in an aqueous solution at 60° C. containing boric acid at a concentration of 4% and potassium iodide at a concentration of 10% for 0.5 minute. Then, the film was washed by being immersed in an aqueous solution at 30° C. containing potassium iodide at a concentration of 1.5% for 10 seconds, and was then dried at 50° C. for 4 minutes to provide a polarizer. To each of both surfaces of the polarizer, a saponified triacetylcellulose film having a thickness of 80 μm was bonded through the use of a polyvinyl alcohol-based adhesive. Thus, a polarizing plate was produced.

2-2. Production of Polarizing Plate with Light-Diffusing Pressure-Sensitive Adhesive Layer Then, the application liquid obtained above was applied to one surface of a 38 μm polyethylene terephthalate (PET) film that had been subjected to silicone treatment (manufactured by Mitsubishi Polyester Film, Inc., MRF38) so that the thickness of a light-diffusing pressure-sensitive adhesive layer after drying was 12 μm, followed by drying at 155° C. for 1 minute. After that, the dried product was transferred to the polarizing plate obtained above to produce a polarizing plate with a light-diffusing pressure-sensitive adhesive layer. The light-diffusing pressure-sensitive adhesive layer had a haze value of 20%.

3. Production of Matte Layer

A commercially available elongate cycloolefin (norbornene)-based resin film (manufactured by Zeon Corporation, product name: "ZEONORZF16", thickness: 40 μm) was used as a substrate. Meanwhile, 80 parts by weight of "UNIDIC ELS-888" (product name) manufactured by DIC Corporation and 20 parts by weight of "UNIDIC RS28-605" (product name) manufactured by DIC Corporation were blended with each other to prepare a resin composition for forming a matte layer. The resin composition was applied to the substrate, and was irradiated with UV light at an exposure dose of 230 mJ/cm to form a matte layer. The resultant matte layer had a thickness of 1.0 μm. Thus, a laminate of the matte layer and the substrate was produced.

4. Louver Layer (Louver Film)

A louver film "LAF3" manufactured by Dai Nippon Printing Co., Ltd. was used.

5. Production of Optical Laminate

The substrate of the laminate of the matte layer and the substrate, and the louver layer (louver film) were bonded to each other, and the substrate of the resultant laminate and the polarizing plate with a light-diffusing pressure-sensitive adhesive layer were bonded to each other via the light-diffusing pressure-sensitive adhesive layer. Thus, an optical laminate as illustrated in FIG. 1 was obtained. The resultant optical laminate satisfied the expressions (1) to (3).

6. Production of Liquid Crystal Display Apparatus

A liquid crystal panel was removed from "iPad (trademark) 2" (product name) (IPS mode) manufactured by Apple Inc. Further, optical films attached to the top and bottom of the liquid crystal cell were removed, and surfaces from which the optical films had been removed were washed. The thus obtained liquid crystal cell was used. The optical laminate obtained in 5. above was bonded to one surface of the liquid crystal cell, and the polarizing plate obtained in 2-1. above was bonded to the other surface. In this case, the optical laminate and the polarizing plate were bonded to each other so that the absorption axis of the polarizer of the optical laminate and the absorption axis of the polarizer of the polarizing plate were perpendicular to each other. Further, a backlight unit removed from the "iPad (trademark) 2" was incorporated on the outside of the optical laminate. Thus, a liquid crystal display apparatus was produced. The resultant liquid crystal display apparatus was subjected to the evaluations (2) to (4). The results are shown in Table 1.

Examples 2 to 9 and Comparative Examples 1 to 11

Optical laminates and liquid crystal display apparatus were produced in the same manner as in Example 1 except that the haze value of the light-diffusing pressure-sensitive adhesive layer and the bias angle of the louver layer were changed as shown in Table 1. The resultant liquid crystal display apparatus were subjected to the same evaluations as in Example 1. The results are shown in Table 1.

TABLE 1

| | Haze (%) | Bias angle (°) | Expression (1) | Expression (2) | Expression (3) | Brightness | Viewing angle characteristic | Moire |
|---|---|---|---|---|---|---|---|---|
| Example 1 | 20 | 6 | ◯ | ◯ | ◯ | ⊚ | ◯ | ⊚ |
| Comparative Example 1 | 20 | 0 | X | ◯ | X | ⊚ | ⊚ | X |
| Example 2 | 20 | 2 | ◯ | ◯ | ◯ | ⊚ | ⊚ | ◯ |
| Example 3 | 20 | 4 | ◯ | ◯ | ◯ | ⊚ | ◯ | ⊚ |
| Comparative Example 2 | 20 | 8 | X | ◯ | ◯ | ⊚ | X | ⊚ |
| Comparative Example 3 | 40 | 0 | X | ◯ | X | ◯ | ⊚ | X |
| Example 4 | 40 | 2 | ◯ | ◯ | ◯ | ◯ | ⊚ | ⊚ |
| Example 5 | 40 | 4 | ◯ | ◯ | ◯ | ◯ | ◯ | ⊚ |
| Example 6 | 40 | 6 | ◯ | ◯ | ◯ | ◯ | ◯ | ⊚ |
| Comparative Example 4 | 40 | 8 | X | ◯ | ◯ | ◯ | Δ | ⊚ |
| Comparative Example 5 | 60 | 0 | X | ◯ | X | Δ | ⊚ | Δ |
| Example 7 | 60 | 2 | ◯ | ◯ | ◯ | Δ | ⊚ | ◯ |
| Example 8 | 60 | 4 | ◯ | ◯ | ◯ | Δ | ◯ | ⊚ |
| Example 9 | 60 | 6 | ◯ | ◯ | ◯ | Δ | ◯ | ⊚ |
| Comparative Example 6 | 60 | 8 | X | ◯ | X | Δ | Δ | ⊚ |
| Comparative Example 7 | 80 | 0 | X | X | X | X | ⊚ | ⊚ |
| Comparative Example 8 | 80 | 2 | ◯ | X | ◯ | X | ⊚ | ⊚ |
| Comparative Example 9 | 80 | 4 | ◯ | X | ◯ | X | ◯ | ⊚ |
| Comparative Example 10 | 80 | 6 | ◯ | X | ◯ | X | ◯ | ⊚ |
| Comparative Example 11 | 80 | 8 | X | X | ◯ | X | Δ | ⊚ |

<Evaluation>

As is apparent from Table 1, the liquid crystal display apparatus using the optical laminate of each of Examples of the present invention, which satisfies the expressions (1) to (3), is excellent in brightness, viewing angle characteristic, and moire characteristic in a balanced manner. Meanwhile, the liquid crystal display apparatus of each of Comparative Examples is insufficient in terms of at least one of the three characteristics, or has relatively low evaluation results for two or more thereof.

INDUSTRIAL APPLICABILITY

The optical laminate of the present invention can be suitably used for a liquid crystal display apparatus. The liquid crystal display apparatus of the present invention can be suitably used for on-board devices, such as various meters arranged in a console, a reverse monitor, a monitor for a car navigation system, and a car audio.

REFERENCE SIGNS LIST 10 polarizer
20 light-diffusing pressure-sensitive adhesive layer
30 matte layer
40 louver layer 41 light-transmitting portions
42 light-absorbing portions
100 optical laminate

The invention claimed is:

1. An optical laminate, comprising, in this order:
a polarizer;
a light-diffusing pressure-sensitive adhesive layer;
a matte layer; and
a louver layer,
wherein the louver layer has light-transmitting portions each having a trapezoidal section arrayed along a film plane, and light-absorbing portions each having a trapezoidal section arrayed between the light-transmitting portions, and
wherein a haze value H of the light-diffusing pressure-sensitive adhesive layer and a bias angle B of the louver layer satisfy relationships represented by the following expressions (1) to (3):

$$2 \leq B \leq 6 \quad (1)$$

$$20 \leq H \leq 60 \quad (2)$$

$$B \times H \geq 40 \quad (3)$$

where the bias angle means a tilt angle of each of the trapezoidal sections with respect to a normal direction.

2. The optical laminate according to claim 1,
wherein the light-diffusing pressure-sensitive adhesive layer contains a pressure-sensitive adhesive and light-diffusible fine particles dispersed in the pressure-sensitive adhesive,
wherein the pressure-sensitive adhesive has a refractive index of from 1.47 to 1.60, and
wherein the light-diffusible fine particles each have a refractive index lower than the refractive index of the pressure-sensitive adhesive.

3. The optical laminate according to claim 2, wherein a refractive index difference between each of the light-diffusible fine particles and the pressure-sensitive adhesive is more than 0 and 0.2 or less.

4. The optical laminate according to claim 2, wherein the light-diffusible fine particles comprise silicone resin fine particles.

5. The optical laminate according to claim 2, wherein the light-diffusible fine particles have a volume-average particle diameter of from 1 μm to 4 μm.

6. The optical laminate according to claim 1, wherein a surface of the matte layer has an arithmetic average roughness Ra of 20 nm or more.

7. The optical laminate according to claim 6,
wherein the matte layer contains fine particles, and
wherein the fine particles have a mode particle diameter in a range of ±50% of a thickness of the matte layer.

8. A liquid crystal display apparatus, comprising:
a liquid crystal cell; and
the optical laminate of claim 1 arranged on an opposite side of the liquid crystal cell to a viewer side,
wherein the polarizer of the optical laminate is arranged on a liquid crystal cell side.

* * * * *